(12) United States Patent
LeCrone

(10) Patent No.: US 10,936,242 B2
(45) Date of Patent: Mar. 2, 2021

(54) CLOUD ACCESS THROUGH TAPE TRANSFORMATION

(71) Applicant: EMC IP Holding Company LLC, Hopkinton, MA (US)

(72) Inventor: Douglas E. LeCrone, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/045,878

(22) Filed: Jul. 26, 2018

(65) Prior Publication Data
US 2020/0034070 A1 Jan. 30, 2020

(51) Int. Cl.
*G06F 9/455* (2018.01)
*G06F 3/06* (2006.01)

(52) U.S. Cl.
CPC ............ *G06F 3/0655* (2013.01); *G06F 3/061* (2013.01); *G06F 3/067* (2013.01)

(58) Field of Classification Search
CPC ..... G06F 3/0664; G06F 3/0607; G06F 3/0608
See application file for complete search history.

(56) References Cited

U.S. PATENT DOCUMENTS

| | | | |
|---|---|---|---|
| 6,353,878 B1* | 3/2002 | Dunham | G06F 11/1456 707/999.009 |
| 9,645,766 B1* | 5/2017 | LeCrone | G06F 3/0604 |
| 2015/0106343 A1* | 4/2015 | Srinivasan | G06F 3/0608 707/692 |
| 2017/0220363 A1* | 8/2017 | Gorlinsky | G06F 3/0664 |
| 2017/0300240 A1* | 10/2017 | Gorlinsky | G06F 3/0607 |
| 2018/0165277 A1* | 6/2018 | Kochura | G06N 5/02 |

* cited by examiner

*Primary Examiner* — Ryan Bertram
*Assistant Examiner* — Trang K Ta
(74) *Attorney, Agent, or Firm* — Muirhead and Saturnelli, LLC

(57) ABSTRACT

Causing data in an in-band storage device coupled to a host computing system to be transferred to an out-of-band (OOB) storage device includes coupling the in-band storage device to the OOB storage device, the in-band storage device detecting commands from the host computing system to transfer the data in the in-band storage device to a cloud storage, and the in-band storage device transferring the data in the in-band storage device to the to the OOB storage device in response to receiving a command from the host computing system to transfer the data in the in-band storage device to the cloud storage. The OOB storage device may be coupled to the cloud storage. Causing data in an in-band storage device to be transferred to an OOB storage device may also include causing data stored at the OOB storage device to be transferred to the cloud storage.

18 Claims, 6 Drawing Sheets

CLOUD ACCESS THROUGH TAPE TRANSFORMATION

BACKGROUND

1. Technical Field

This application relates to computer storage devices, and more particularly to the field of transferring data between storage devices.

2. Description of Related Art

A significant number of mainframe applications that access tape drive data are still in use. In many cases, tape drives have been replaced by hardware and/or software that provides tape drive simulation/emulation. For example, the DLm960 device provided by EMC Corporation of Hopkinton, Mass. provides tape drive functionality so that applications in a host system coupled thereto (e.g., an IBM System z host device). Thus, applications running on a host system coupled to a DLm960 (or similar) send tape commands and data thereto and receive tape data and status as if the applications were communicating with an actual tape drive. The DLm960 may include non-volatile storage (e.g., disk array) to store tape data and tape emulation information.

One issue associated with using a tape emulation device (or even an actual tape device) is that data transfers between a storage device coupled to a host and a tape emulation device coupled to the host is through the host. That is, to transfer data between the tape emulation device and the storage device, the host first reads the data from one of the devices and writes the data to the other one of the devices. Although this may be acceptable in the some instances, it may be inefficient when the host is merely acting as a conduit for data transfers between the tape device and the storage device. A proposed solution is presented in U.S. Pat. No. 9,645,766 to Douglas E. LeCrone titled "TAPE EMULATION ALTERNATE DATA PATH", which is incorporated by reference herein. While this addresses inefficiencies of passing data through the host, it requires modification (non-customization) of the tape unit.

Accordingly, it is desirable to provide a data transfer solution that reduces or eliminates passing data through the host when the data is being transferred between a tape unit and a storage device while avoiding any need to modify or customize the tape unit.

SUMMARY OF THE INVENTION

According to the system described herein, transferring data between a first storage device coupled to a host computing system and a second storage device coupled to the first storage device includes the first storage device receiving a command from the host computing system, the first storage device determining if the command is an out-of-band (OOB) storage command, and, if the command is an OOB storage command, the first storage device sending a command to the second storage device to cause data to be transferred directly between the first storage device and the second storage device independent of the host computing system. Transferring data between a first storage device coupled to a host computing system and a second storage device coupled to the first storage device may also include the first storage device emulating a host computing system in connection with communicating with the second storage device. The second storage device may be a tape emulation unit. The data may be stored on the second storage device using an AWS virtual tape format. The OOB storage commands may include a mounting tape command, an exchanging data with tape command, a media changer command, and a receiving media changer information command. The data may be transformed while the data is being transferred between the first storage device and the second storage device. The host computing system may expect a return value from the second storage device following sending the command to the second storage device. The first storage device may hold the return value from the second storage device. The host computing system may request the return value from the first storage device. The host computing system may be coupled to the second storage device.

According further to the system described herein, a non-transitory computer readable medium contains software that transfers data between a first storage device coupled to a host computing system and a second storage device coupled to the first storage device. The software includes executable code that receives a command from the host computing system, executable code that determines if the command is an out-of-band (OOB) storage command, and executable code that sends a command to the second storage device to cause data to be transferred directly between the first storage device and the second storage device independent of the host computing system if the command is an OOB storage command. The software may also include executable code that emulates a host computing system in connection with communicating with the second storage device. The second storage device may be a tape emulation unit. The data may be stored on the second storage device using an AWS virtual tape format. The OOB storage commands may include a mounting tape command, an exchanging data with tape command, a media changer command, and a receiving media changer information command. The data may be transformed while the data is being transferred between the first storage device and the second storage device. The host computing system may expect a return value from the second storage device following sending the command to the second storage device. The first storage device may hold the return value from the second storage device. The host computing system may request the return value from the first storage device. The host computing system may be coupled to the second storage device.

According further to the system described herein, causing data in an in-band storage device coupled to a host computing system to be transferred to an out-of-band (OOB) storage device includes coupling the in-band storage device to the OOB storage device, the in-band storage device detecting commands from the host computing system to transfer the data in the in-band storage device to a cloud storage, and the in-band storage device transferring the data in the in-band storage device to the to the OOB storage device in response to receiving a command from the host computing system to transfer the data in the in-band storage device to the cloud storage. The OOB storage device may be coupled to the cloud storage. Causing data in an in-band storage device coupled to a host computing system to be transferred to an out-of-band (OOB) storage device may also include causing data stored at the OOB storage device to be transferred to the cloud storage. Causing data in an in-band storage device coupled to a host computing system to be transferred to an out-of-band (OOB) storage device may also include the in-band storage device emulating a host computing system in connection with communicating with the OOB storage device. The OOB storage device may be a tape emulation unit. The data may be stored in the OOB storage device using an AWS virtual tape format. The host computing system may expect a return value from the cloud storage following sending the command to transfer the data in the in-band storage device to a cloud storage. The in-band storage device may hold the return value received from the OOB storage device. The host computing system may request the return value from the in-band storage device.

According further to the system described herein, a non-transitory computer readable medium contains software that causes data in an in-band storage device coupled to a host computing system to be transferred to an out-of-band (OOB) storage device coupled to the in-band storage device. The software includes executable code that detects commands received at the in-band storage device from the host computing system to transfer the data in the in-band storage device to a cloud storage, and executable code that transfers the data in the in-band storage device to the to the OOB storage device in response to receiving a command from the host computing system to transfer the data in the in-band storage device to the cloud storage. The OOB storage device may be coupled to the cloud storage. The software may also include executable code that causes data stored at the OOB storage device to be transferred to the cloud storage. The software may also include executable code that emulates a host computing system in connection with communicating with the OOB storage device. The OOB storage device may be a tape emulation unit. The data may be stored in the OOB storage device using an AWS virtual tape format. The host computing system may expect a return value from the cloud storage following sending the command to transfer the data in the in-band storage device to a cloud storage. The in-band storage device may hold the return value received from the OOB storage device. The host computing system may request the return value from the in-band storage device.

DETAILED DESCRIPTION OF VARIOUS EMBODIMENTS

Figure 1:
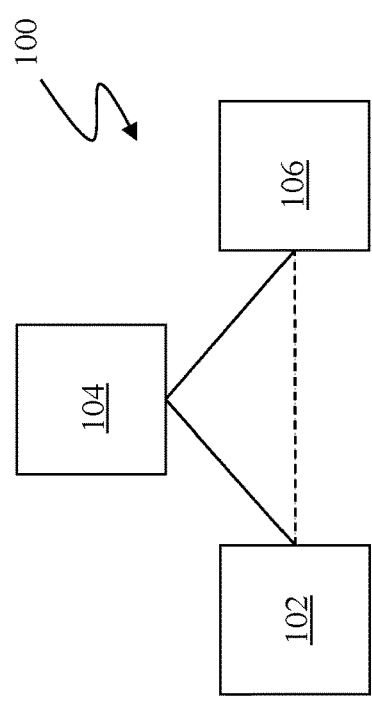
FIG. 1 is a schematic diagram showing a host, a storage device, and a tape emulation device used in connection with an embodiment of the system described herein.

Referring to FIG. 1, a diagram 100 shows a host 102 coupled to a storage device 104 that is coupled to a tape unit 106. The host 102 may be any appropriate computing system, such as an IBM System z computing system. The storage device 104 may be any storage device capable of providing the functionality described herein, such as Symmetrix storage array provided by EMC Corporation of Hopkinton, Mass. The tape unit 106 may be any physical tape unit or may be a tape emulation unit that provides tape emulation functionality so that a device writes tape data and commands to the tape emulation unit 106 and reads tape data and status information from the tape emulation unit 106 as if the tape emulation unit 106 were an actual computer tape device. The tape unit 106 may be implemented using any appropriate device, such as the DLm960 tape emulation device provided by EMC Corporation of Hopkinton, Mass. The tape unit 106 may also correspond to any out-of-band (OOB) storage mechanism that represents additional storage capability beyond storage capabilities provided by the storage device 104. In an embodiment herein, data is exchanged with the tape unit 106 using any appropriate format. Note that, although only a single host 102, a single storage device 104, and a single tape unit 106 are shown, it is understood by one of ordinary skill in the art that the system may be extended to have more than one of one or more of each.

The host 102, the storage device 104, and the tape unit 106 may be coupled using a conventional FICON connection or possibly a network, such as the Internet, a different TCP/IP network, a SAN, a WAN, and/or any other appropriate mechanism for transporting data between the host 102 and the storage device 104 and between the storage device 104 and the tape unit 106. Data connections between the components may be synchronous or asynchronous (or possibly a combination thereof). In some embodiments, the host 102 may be coupled directly to the tape unit 106 (shown in FIG. 1 as a dashed line) to provide an alternative, conventional, data transfer mechanism between the host 102 and the tape unit 106 so that, for example, specific data may be transferred from the storage device 104 to the tape unit 106 and then subsequently read directly from the tape unit 106 by the host 102, or vice versa.

Figure 2:
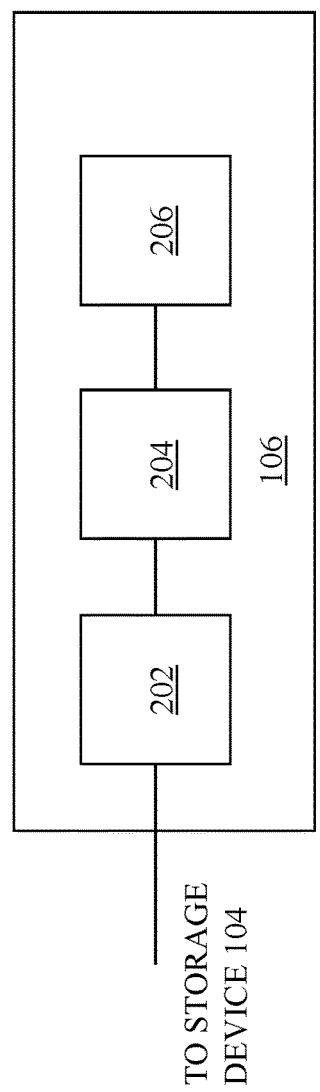
FIG. 2 is a schematic diagram illustrating a tape emulation device according to an embodiment of the system described herein.

Referring to FIG. 2, the tape unit 106 is shown in more detail as a tape emulation unit that includes a front end component 202, a data mover/server 204, and a tape emulation storage device 206 coupled thereto. The front end component 202 may include a FICON link that may be coupled to the storage device 104 for data communication between the storage device 104 and the tape unit 106. Other types of links may be used. The front end component 202 may include FICON link emulation functionality as well as tape emulation functionality, such as that provided by components of the DLm960.

The data mover/server 204 may be coupled to the front end component 202 using, for example, a GigE switch while the storage device 206 is coupled to the data mover/server 204 using any appropriate protocol, such as Fibre Channel. The data mover/server 204 may be accessed by the front end component 202 using any appropriate protocol, such as NFS (Network File System). In an embodiment herein, the data mover/server 204 may include an NFS server, such as a Celerra data mover, and the storage device 206 may be a Clarrion or Symmetrix data storage array. There may be other components used instead of, and/or in addition to, the NFS server and the data storage array.

Conventionally, a tape storage device or tape emulation storage device, such as the tape unit 106, is coupled to and communicates directly with a host, such as the host 102. Applications running on the host 102 execute conventional tape operations, such as mounting tapes, exchanging data with tapes (reading and writing), providing media changer commands, receiving media changer information (e.g., bar code information), etc. However, in the system described herein, the storage device 104 is coupled directly to the tape unit 106. The storage device 104 is configured to act as a host with respect to the connection between the storage device 104 and the tape unit 106. In an embodiment herein, the storage device 104 and the tape unit 106 are coupled using a conventional FICON channel/protocol so that the storage device 104 acts as a FICON initiator to the tape unit 106. If the FICON channel at the storage device 104 supports the IBM 3590 protocol, then the tape unit 106 could be a Dell/EMC DLm960 virtual tape unit. Of course, any other type of tape unit may be used, including an actual tape drive and it is also possible to use any type of out-of-band (OOB) storage.

In the system described herein, the host 102 sends metadata information to the storage device 104 to direct the storage device 104 to exchange data with the tape unit 106. Thus, relatively large amounts of data may exchanged between the storage device 104 and the tape unit 106 without transferring any data through the host 102. Moreover, unlike solutions described in U.S. Pat. No. 9,645,766 titled "TAPE EMULATION ALTERNATE DATA PATH" to Douglas E. LeCrone, which is incorporated by reference herein, the system described herein does not require that the tape unit 106 be modified from an off-the-shelf configuration since the storage device 104 emulates a host when coupled to the tape unit 106. In an embodiment herein, the host 102 provides metadata to the storage device 104 using any appropriate format that can be detected and interpreted by the storage device 104.

Figure 3:
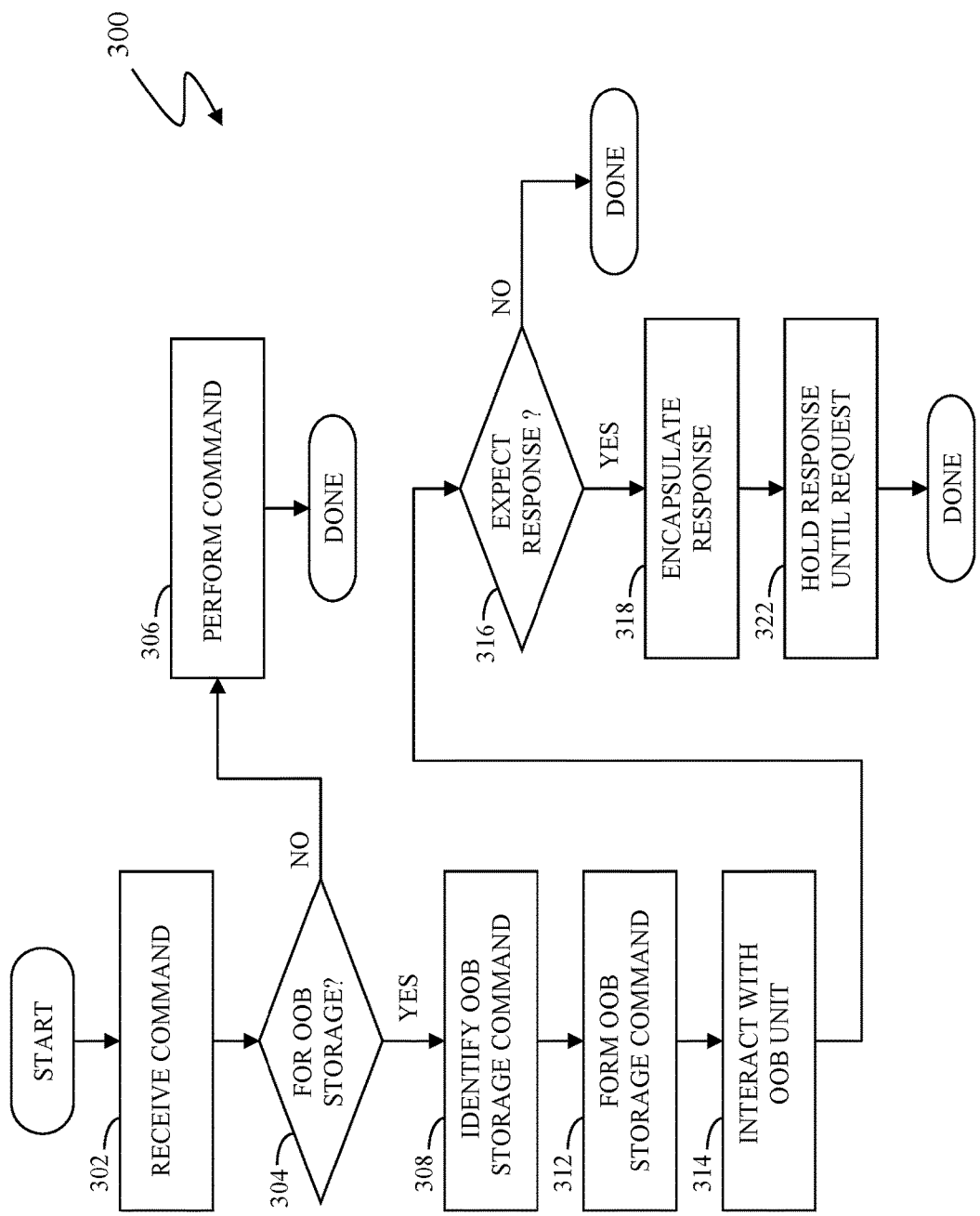
FIG. 3 is a flow diagram illustrating processing performed at a storage device to handle metadata received from a host and process tape unit commands according to an embodiment of the system described herein.

Referring to FIG. 3, a flow diagram 300 shows processing performed at the storage device 104 in connection with receiving from the host 102 commands that may include metadata for transferring data between the storage device 104 and an out-of-band (OOB) storage device, such as the tape unit 106. The commands may be any type of OOB storage command that are used for operating an OOB storage device, such as a tape drive and possibly also a media changer. The commands may include commands for mounting tapes, exchanging data with tapes (reading and writing), media changer commands, receiving media changer information (e.g., bar code information), etc. Processing begins at a first step 302 where the storage device 104 receives a command from the host 102. Following the step 302 is a test step 304 where it is determined whether the received command is an OOB storage command (i.e., a command relating to an OOB storage device, such as the tape unit 106). The host 102 may identify OOB storage commands by using a flag or other type of marker in the command to indicate to the storage device 104 that the command is an OOB storage command. If it is determined at the step 304 that the received command is not an OOB storage command (i.e., is a conventional storage command operation command), then control transfers from the test step 304 to a step 306 where the command is processed by the storage device in a conventional manner. For example, at the step 306, the storage device 104 may execute a conventional command to transfer data from the storage device 104 to the host 102. Following the step 306, processing is complete.

If it is determined at the test step 304 that the command that has been received is for OOB storage, then control transfers from the test step 304 to a step 308 where the storage device 104 identifies the OOB storage command. The identification may be performed using any appropriate mechanism, such as a conventional lookup table (e.g., code x embedded in the command received by the storage device 104 corresponds to OOB storage command Y). In some embodiments, the code that is embedded in the command to the storage device 104 will be completely independent from the corresponding OOB storage command so that a lookup table is required. In other embodiments, the code that is embedded in the command to the storage device 104 can be used to form the corresponding OOB storage command, such as with a formula or, in some cases, the actual OOB storage command may be embedded. Following the step 308 is a step 312 where the OOB storage command is formed. In an embodiment herein, the OOB storage command may be any conventional tape and/or media changer command, such as mount a tape, read data from the tape unit 106 to the storage device 104, receive media changer information, such as bar code labels, etc. In an embodiment herein, tape-related commands may use any appropriate format.

Following the step 312 is a step 314 where the storage device 104 interacts with the OOB storage device (e.g., the tape unit 106) to perform the OOB storage command. For example, if the OOB storage command calls for transferring data from the storage device 104 to the tape unit 106, then at the step 314 the storage device 104 sends a command to the tape unit 106 to begin receiving data and then the storage device 104 sends the data to the tape unit 106 and then the storage device receives a completion code/status from the tape unit 106. In some cases, when the OOB storage device is a virtual tape unit, like the virtual tape unit 106, the data may be stored using a conventional format such as AWS Virtual Tape format, which allows exiting tape applications to access the data directly from the tape unit 106. Following the step 314 is a test step 316 where it is determined if the host device 102 expects and/or has requested a return status/code or data or some other information. In some instances, the host 102 may return status (e.g., success/fail) or receive requested data (e.g., media changer bar code ID). If it is determined at the step 316 that the host 102 is not to receive any return information, then processing is complete. Otherwise, control passes from the test step 316 to a step 318 where the information to be returned (from the interaction at the step 314) is encapsulated into an appropriate format, such as the format used by the storage device 104 to return information to the host 102. Following the step 318 is a step 322 where the encapsulated information is held at the storage device 104 until the information is requested by the host 102. In other embodiments, the encapsulated information may be sent directly to the host 102 at the step 322 without waiting for any request. Following the step 322, processing is complete.

In some cases, data is transferred between the storage device 104 and the OOB storage, such as the tape unit 106, without making any modifications to the data. In other instances, the data may be logically transformed in connection with any transfer between the storage device 104 and the OOB storage, such as the tape unit 106. The logical transformation may be built-in and automatic or may be provided as part of any OOB storage command.

Note that in the system described above, applications that access the OOB storage, such as the tape unit 106, provide specific OOB storage commands that are embedded in commands to the storage device 104. However, in some instances, it may be impractical to rewrite/modify an application that accesses OOB storage, such as the tape unit 106, in which case the application expects the host 102 to be coupled directly to the tape unit 106. This may be addressed by modifying drivers or similar low level software on the host 102 to simulate attachment to a tape drive or a tape storage emulation device, such as the tape unit 106, so that applications on the host 102 that perform tape and media changer operations do not need to be modified. When drivers or similar low level software is modified on the host 102 to handle tape-related commands, applications on the host 102 may perform tape and media changer operations as if the host were coupled to a tape unit, such as the tape unit 106, while the low level software at the host 102 and software on the storage device 104 cause data to be exchanged between the storage device 104 and the tape unit 106. This is described in more detail elsewhere herein.

Figure 4:
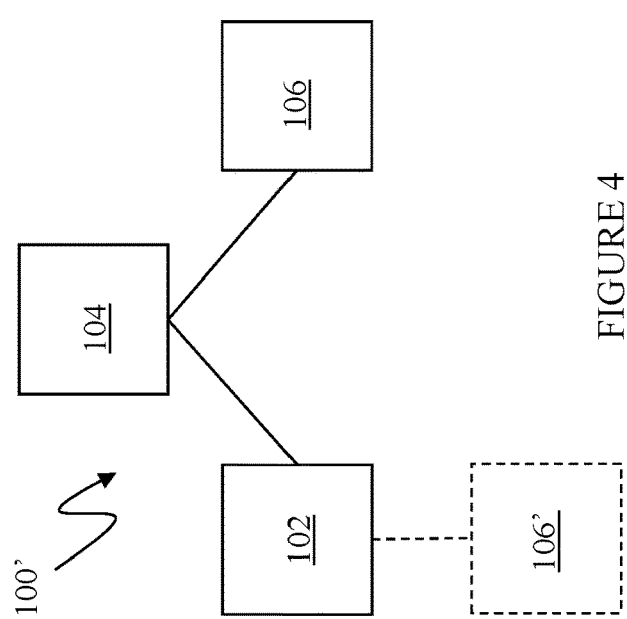
FIG. 4 is a schematic illustration showing a host, a storage device, a tape emulation device, and a phantom tape emulation device according to an embodiment of the system described herein.

Referring to FIG. 4, a diagram 100' shows a system similar to the system shown by the diagram 100 of FIG. 1 that includes the host 102, the storage device 104, and the tape unit 106. The diagram 100' also shows a phantom tape unit 106' coupled to the host 102. The phantom tape unit 106' is not an actual tape unit or tape emulation unit, but instead represents driver software and other low level software on the host 102 that presents applications on the host 102 with what appears to the applications to be a tape unit or tape emulation unit, like the tape unit 106. Thus, for example, an application would perform a read operation to read data on the phantom tape unit 106' and would be returned data from the tape unit 106 through the storage device 104, as described in more detail elsewhere herein.

Figure 5:
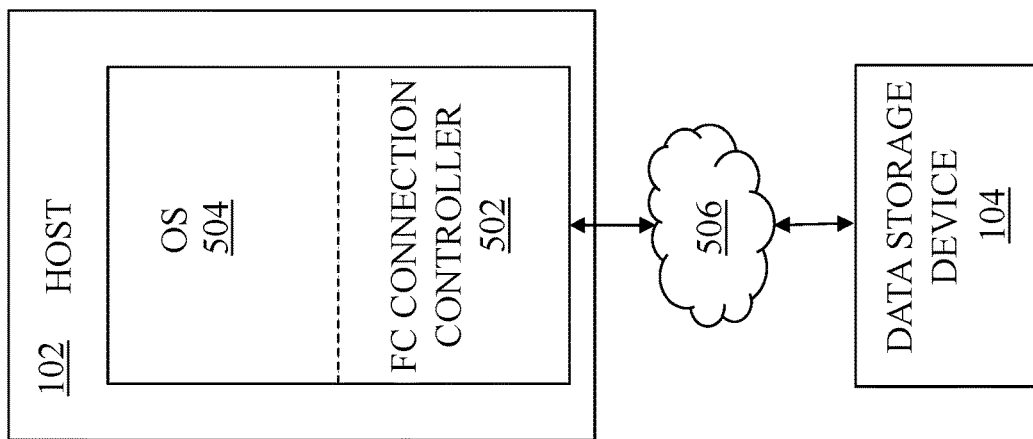
FIG. 5 is a schematic illustration showing a system with a FICON connection between a host and a data storage device according to an embodiment of the system described herein.

FIG. 5 is a schematic illustration showing the host 102 with a FICON connection controller 502 for providing a FICON connection between the host 102 and the data storage device 104 according to an embodiment of the system described herein. The host 102 may be a computer running Linux or some other appropriate operating system 504. I/O processing on the host 102 may operate with the FICON connection controller 502 to enable I/O operations with the data storage device 104. The FICON connection controller 502 may send and receive data to and from the data storage device 104 using a remote connection mechanism 506 that may include a network (such as the Internet, and appropriate connection thereof). The data storage device 104 may include physical storage volumes and/or logical volumes, such as EMC Corporation's Symmetrix data storage facility. The FICON connection controller 502 may act as an I/O subsystem providing FICON communication capability. The data storage device 104 may include features and/or components enabling FICON channel communication with the host 102. For a discussion of features and implementations of FICON systems and suitable channel protocols operating therewith on z/Architecture computing systems, reference is made to J. Entwistle, "IBM System z10 FICON Express8 FCP Channel Performance Report," Technical paper, August 2009, 27 pp., which is incorporated herein by reference.

It is noted that various components of the system may be emulated. For further discussion of emulation of I/O computing components, particular Fibre Channel/FICON connection components, reference is made to U.S. Pat. No. 9,665,502 to Jones et al., issued May 30, 2017, entitled "Virtual I/O Hardware" and to U.S. Pat. No. 9,170,904 to LeCrone et al., issued Oct. 27, 2015, entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 506 may include an Internet connection and/or possibly some other types of connection(s). In an embodiment herein, the connection mechanism 506 may be directly incompatible with a FICON connection. The incompatibility may be hardware incompatibility, software incompatibility, or both. Such connection mechanism 506 may not support a direct FICON connection but, instead, rely on a FICON emulator (and/or other emulator(s)) for providing data in an appropriate format. It is further noted that where FICON emulation is being performed, the data storage device 104 may include or be coupled to a FICON emulator portion that may send and receive data to and from the connection mechanism 506 and also emulates a Fibre Channel FC0 physical layer for the benefit of the data storage device 104. Thus, in such a case involving emulation, both the host 102 and the data storage device 104 may operate as if the devices 102, 104 were communicating using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol. zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

Figure 6:
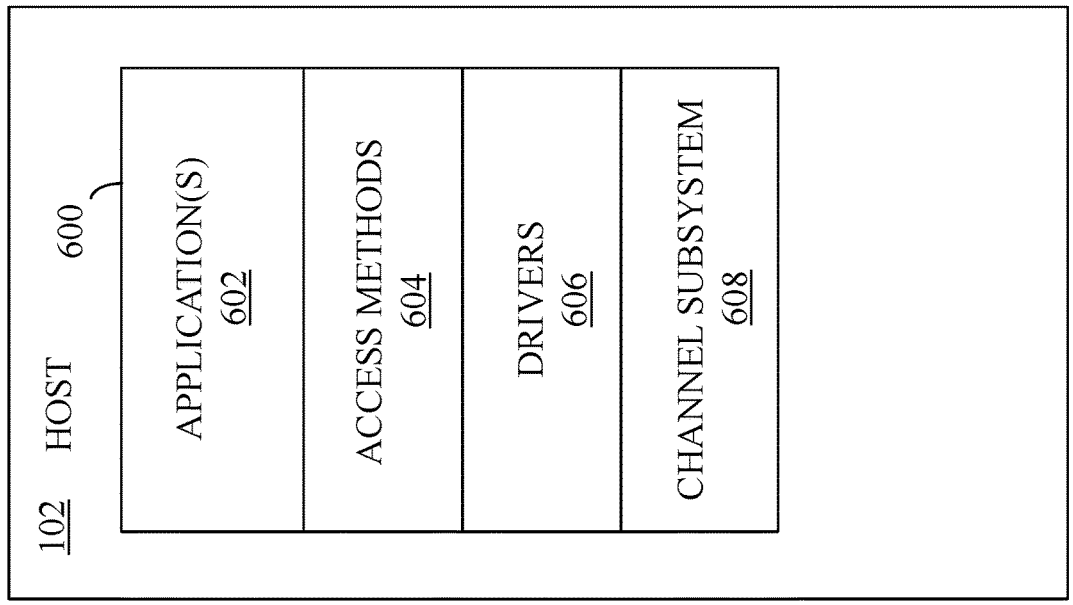
FIG. 6 is a schematic illustration showing software layers in a host according to an embodiment of the system described herein.

Referring to FIG. 6, the host 102 is illustrated with software 600 having an application(s) layer 602, an access methods layer 604, a drivers layer 606, and a channel subsystem layer 608. The application(s) layer 602 includes one or more software applications that run on the host 102. The access methods layer 604 includes I/O routines (e.g., read, write, open, etc.) that are used by applications in the application(s) layer 602 in connection with performing I/O operations. Software in the application(s) layer 602 calls specific routines in the access methods layer 604 to access data on a storage device coupled to the host.

The I/O routines in the access methods layer 604 call driver routines in the drivers layer 606 that perform lower-level device specific operations that depend upon the specific type of I/O device and the type of connection thereto. For example, a first driver for a Symmetrix storage device coupled to the host 102 by a FICON connection may be different than a second driver used for a different type of non-volatile storage device coupled to the host 102 using a different type of connection. Note, however, that an application in the application layer 602 may call the same routine (e.g., read) in the access layer 604 irrespective of the physical hardware (and connection there) used for the data, but that the routine in the access layer 604 that is called may call different routines in the drivers layer 606, depending upon a specific configuration/hardware of the system.

The channel subsystem layer 608 includes routines that control the hardware used for I/O operations, including any storage devices and channels used for transferring data between the host 102 and the storage device 104. Routines in the drivers layer 606 call routines in the channel subsystem layer 608 to perform hardware operations and to transfer data to and from the host 102 and to exchange status and control information to facilitate control of the I/O hardware.

In an embodiment herein, routines in the drivers layer 606 that relate to accessing a tape unit are modified to provide appropriate commands to the storage device 104 to provide interaction between the storage device 104 and the tape unit. Thus, when an application in the applications layer 602 performs a tape-related command (e.g., attach tape unit), the application calls a routine in the access methods layer 604 that calls an appropriate driver in the drivers layer 606. However, although the driver in the drivers layer 606 is presented to the routine in the access methods layer 604 as a conventional tape unit driver, the driver will not directly perform tape unit operations but will, instead, provide a command to the storage unit 104 that indicates a tape-related command that is to be pass on to the tape unit 106, as described elsewhere herein (see, for example, FIG. 3 and the related text). This is described in more detail elsewhere herein.

Figure 7:
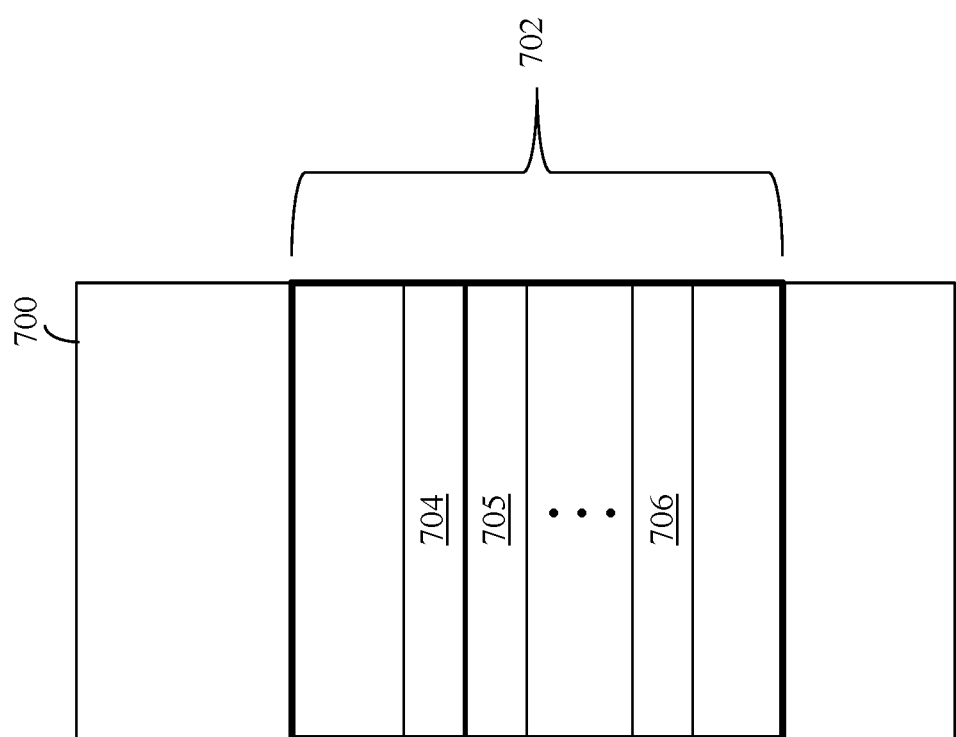
FIG. 7 is a diagram illustrating a UCB accessing a first physical storage space according to an embodiment of the system described herein.

Referring to FIG. 7, a memory space 700 of a host computer (e.g., the host 102) includes a common area 702 that may be accessed by different application running on the host computer 102. In an embodiment herein, more than one of the applications of the host computer may access that same portion(s) of the common area 702, although in some embodiments, there may be restrictions on multiple applications accessing the same memory space for writing at the same time and/or restrictions on simultaneous reading and writing.

In an embodiment herein, the host computer may be an IBM system running the MVS or z/OS operating system, although the system described herein may be implemented using any appropriate operating system. The common area 702 may include a plurality of UCBs (Unit Control Blocks) 704-706, which provide metadata for applications to access logical devices. In some cases (e.g., storage devices, tape devices), the UCB provides information that is used in connection with accessing physical volume space corresponding to logical volume space of the UCB. An application accessing a tape device may access an appropriate one (or more) of the UCBs 704-706 corresponding to one or more logical devices, including tape emulation devices.

In the embodiment illustrated in FIG. 4, applications running on the host 102 perform tape-related operations such as mount tape, read tape, access a media changer, get bar code information from the media changer, etc. However, rather than accessing any tape drive or tape emulation unit, the applications are accessing the phantom tape drive 106', which is created by modifying the drivers 606 to cause tape-related commands to be transferred from the host 102 to the storage device 104 that send tape-related commands to the tape unit 106. Similarly, applications running on the host 102 receive tape-related status information that is transferred from the tape unit 106 to the storage device 104 and then to the host 102 even though it appears to the applications that the status information was received from the phantom tape drive 106'. The applications in the applications layer 602 may have no information regarding the actual path of the data and operate as if the phantom tape drive 106' were an actual tape unit were coupled directly to the host 102.

Note that, since applications in the applications layer 602 expect that the host 102 is coupled directly to a tape unit (e.g., the phantom tape unit 106'), then there may be instances where the applications expect to read data into the host 102 or write data from the host 102. Of course, if an application expects the host 102 to manipulate tape data, then the data needs to be transferred to the host 102. However, in the case of data transfer operations that transfer data between the storage device and the tape unit 106, the appropriate driver in the drivers layer 606 may formulate a tape-related command that allows the data to be transferred without the data needing to be provided to the host 102. For example, a first command in an application to read specific data from the tape unit 106 and an adjacent command to write the same data to the storage unit 104 may be converted by the driver into a single tape-related command to transfer the data from the tape unit 106 to the storage device 104 so that the data is never received by the host 102. In some cases, if an application modifies tape data, then the data may be transferred to the host 102 even though the data is also being transferred between the storage device 104 and the tape unit 106. However, it may also be possible to forgo transferring modified data to the host 102 if the data may be logically transformed in connection with the moving the data between the storage device 104 and the tape unit 106, as described elsewhere herein. The logical transformation may be built-in and automatic or may be provided as part of any transfer command.

Figure 8:
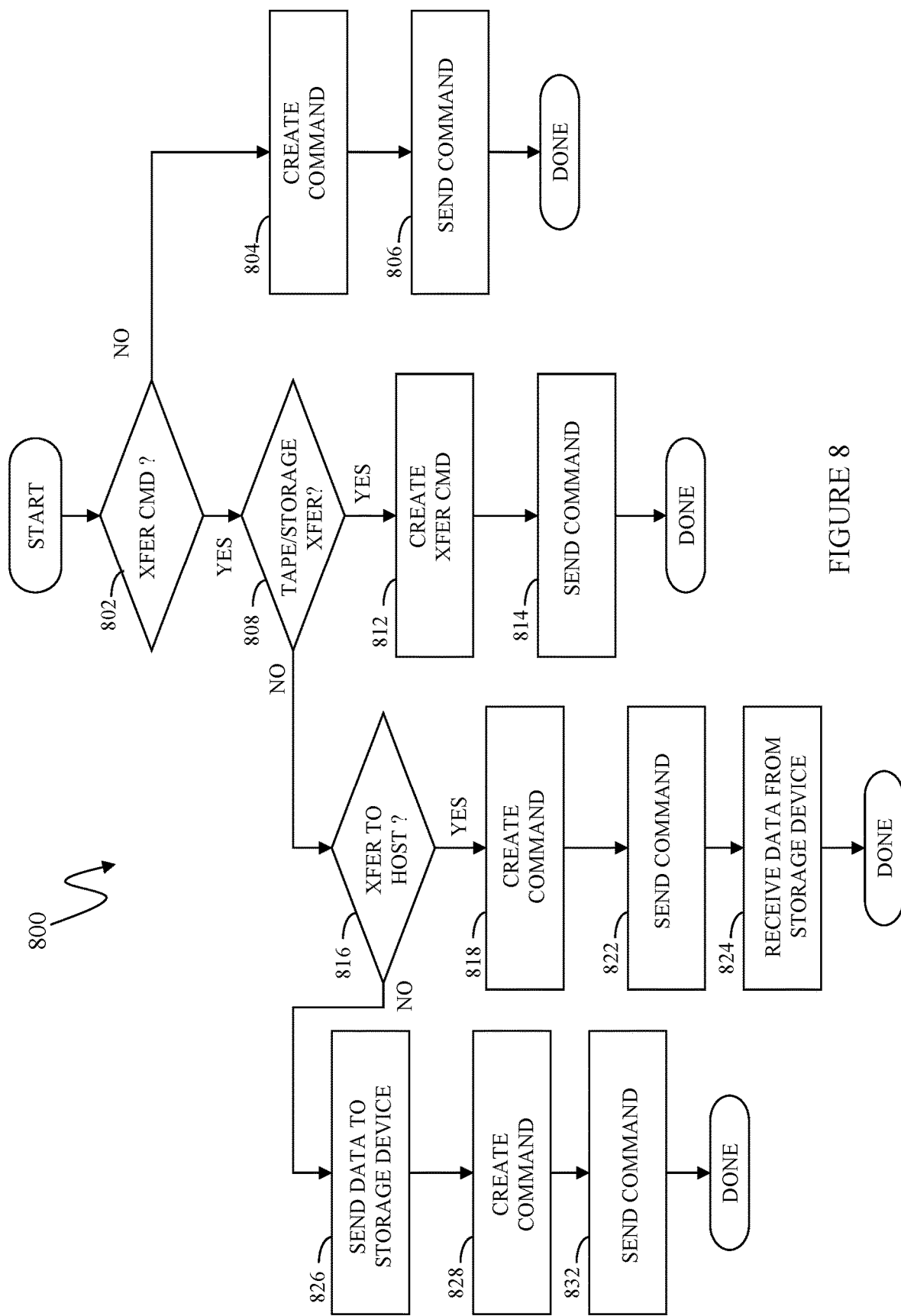
FIG. 8 is a flow diagram illustrating processing performed at a host to handle transferring commands to a storage device according to an embodiment of the system described herein.

Referring to FIG. 8, a flow diagram 800 illustrates steps performed by a driver in the drivers layer 606 of the host 102 handling a tape-related command generated in connection with an application running in the applications layer 602 of the host 102. Processing begins at a first step 802 where it is determined if the tape-related command involves transferring data (e.g., read or write) or not (e.g., mount tape drive). If it is determined at the step 802 that the tape-related command does not involve transferring data, then control transfers from the test step 802 to a step 804 where the driver creates the command for the storage device 104 which will result in the storage device 104 interacting with the tape unit 106, as described elsewhere herein. Following the step 804 is a step 806 where the command is sent to the storage device by the driver through the channel subsystem 608 to the storage device 104. Following the step 806, processing is complete.

If it is determined at the test step 802 that the tape-related command involves transferring data, then control transfers from the test step 802 to a test step 808 where it is determined if the tape-related transfer command transfers data between the storage device 104 and the tape unit 106. Note that it is possible to have more than one tape-related command that transfers data between the storage device 104 and the tape unit 106. For example, a first command could read data from the tape unit 106 and a second command could write the same data back to the storage device 104. If it is determined at the test step 808 that the tape-related transfer command transfers data between the storage device 104 and the tape unit 106, then control transfers from the test step 808 to a step 812 where the driver creates the transfer command for the storage device 104 which will result in the storage device 104 interacting with the tape unit 106, as described elsewhere herein, to transfer data between the storage device 104 and the tape unit 106. Following the step 812 is a step 814 where the command is sent to the storage device 104 by the driver through the channel subsystem 608 to the storage device 104. Following the step 814, processing is complete.

If it is determined at the test step 808 that the tape-related transfer command does not transfer data between the storage device 104 and the tape unit 106 (and thus transfers data to or from the host 102), then control transfers from the test step 808 to a test step 816 where it is determined if data is being transferred from the tape unit 106 to the host 102. If so, then control transfers from the test step 816 to a step 818 where the driver creates the transfer command for the storage device 104 which will result in the storage device 104 interacting with the tape unit 106, as described elsewhere herein, to transfer data from the tape unit 106 to the storage device 104. Following the step 818 is a step 822 where the command is sent to the storage device 104 by the driver through the channel subsystem 608 to the storage device 104. Following the step 822 is a step 824 where the host 102 receives the data from the storage device 104 (see, for example, the steps 316, 318, 322 of the flow diagram 300, discussed above). Following the step 824, processing is complete.

If it is determined at the test step 816 that data is not being transferred from the tape unit 106 to the host 102 (and thus is being transferred from the host 102 to the tape unit 106), then control transfers from the test step 816 to a step 826 where the host transfers the data to the storage device 104. Following the step 826 is a step 828 where the driver creates a transfer command for the storage device 104 which will result in the storage device 104 interacting with the tape unit 106, as described elsewhere herein, to transfer the data from the storage device 104 to the tape unit 106. Following the step 828 is a step 832 where the command is sent to the storage device 104 by the driver through the channel subsystem 608 to the storage device 104. Following the step 832, processing is complete.

In some cases, it is desirable to be able to transfer data from a storage device to a cloud storage and/or some other type of archive storage. The transfers are more efficient if the host does not need to receive or send any data in connection with these transfers so that the data is transferred directly between the storage device and the cloud/archive storage. That is, a direct transfer between a storage device and the cloud/archive storage is more efficient than having the host read data from either the storage device or the cloud/archive storage and writing the data back out to the other one of the storage device or the cloud/archive storage. In some cases, the storage device may have a built in mechanism for directly transferring data between the storage device and the cloud/archive storage where the built in mechanism may be accessed by the host. For example, the host sends a command to the storage device to cause the storage device to transfer particular blocks of the storage device to particular locations in a cloud storage area. However, for systems where the storage device is not configured to access cloud storage directly, it can be a challenge to handle commands from a host to transfer data between the storage device and cloud/archive storage.

Figure 9:
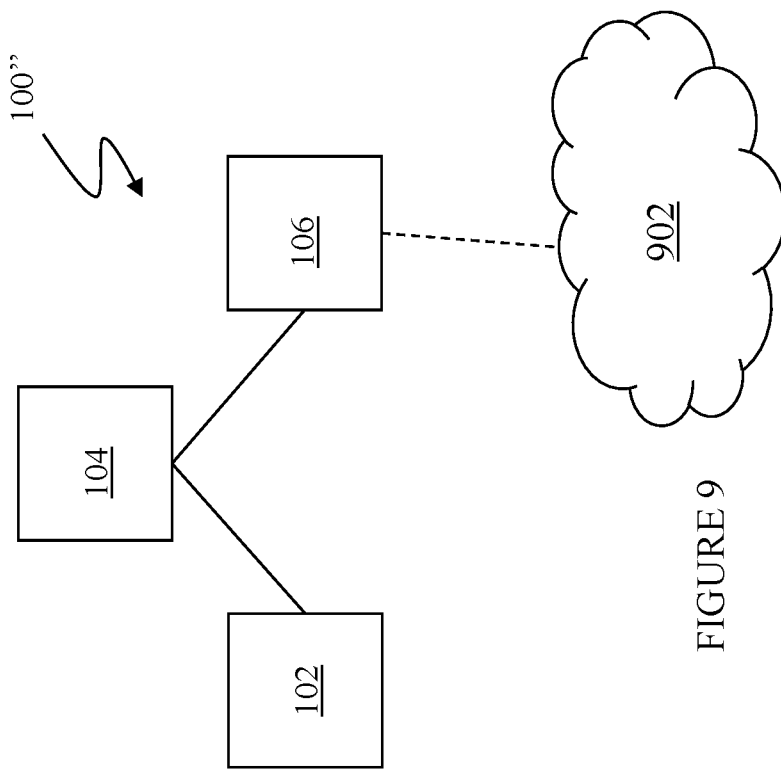
FIG. 9 is a schematic illustration showing a host, a storage device, a tape emulation device, and a cloud storage according to an embodiment of the system described herein.

Referring to FIG. 9, a diagram 100" illustrates an embodiment that includes the host 102, the storage device 104, and the tape unit 106. The tape unit 106 may be coupled to a cloud storage 902, which exchanges data with the tape unit 106. In other embodiments, the cloud storage 902 may be replaced with other types of archive storage, including a disk array storage, another tape unit, etc. As explained in more detail elsewhere herein, the storage device 104 receives commands from the host 102 to transfer data on the storage device 104 to cloud storage or vice versa. In response thereto, the storage device exchanges data with the tape unit 106 which may then, optionally, exchange data with the cloud storage 902.

Figure 10:
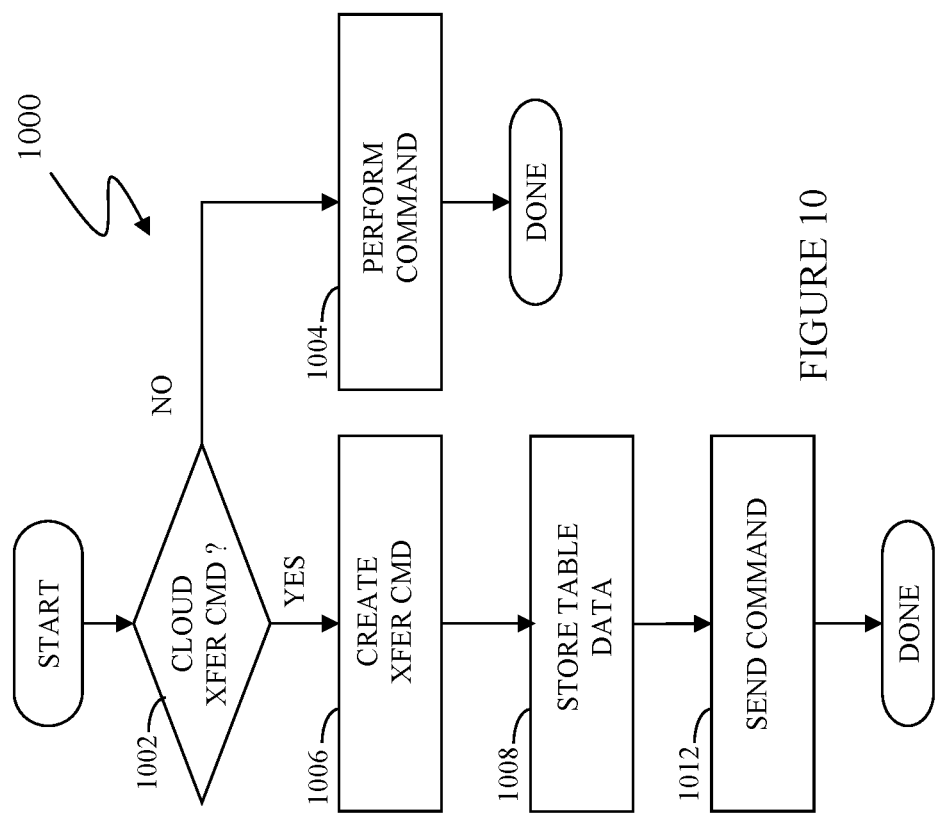
FIG. 10 is a flow diagram illustrating processing performed at a host to handle cloud transfer commands according to an embodiment of the system described herein.

Referring to FIG. 10, a flow diagram 1000 illustrates steps performed by a driver in the drivers layer 606 of the host 102 handling data I/O operations generated in connection with an application running in the applications layer 602 of the host 102. Some of the I/O operations may correspond to commands to transfer data between the storage device 104 and cloud storage. Processing begins at a first step 1002 where it is determined if the I/O operation involves exchanging data between the storage device 104 and cloud storage. If not, then control transfers from the test step 1002 to a step 1004 where the driver performs a conventional I/O operation, such as transferring data from the host 102 to the storage device 104. Following the step 1004, processing is complete.

If it is determined at the test step 1002 that the I/O operation involves exchanging data between the storage device 104 and cloud storage, then control passes from the test step 1002 to a step 1006 where a command is created to cause the storage device 104 to transfer data to the tape unit 106 or vice versa. An example of an I/O operation that involves exchanging data between the storage device 104 and cloud storage is an I/O operation that instructs the storage device 104 to migrate identified data on the storage device 104 to cloud storage. Creating a command to transfer data between the storage device 104 and the tape unit 106 is described in more detail elsewhere herein. Following the step 1006 is a step 1008 where a table that contains a mapping between data on the tape unit 106 and data the host reads or writes to cloud storage is updated. In an embodiment herein, a table is maintained that maps cloud storage locations (e.g., cloud provider, bucket ID, etc.) to tape unit locations (e.g., tape volume identifier, file name, position, etc.). In an embodiment herein, the table is stored on the host 102 and may be maintained by the drivers in the drivers layer 606 and/or as part of a table management system. An advantage of maintaining the table at the host 102 is that the storage device 104 does not require modifications to handle the mapping. In other embodiments, the table may be maintained at the storage device 104, which receives relevant information by having the command created at the step 1006 include cloud access information (cloud provider, bucket ID, etc.) in the command. An advantage of maintaining the table at the storage device 104 is that other hosts may access the data based on the cloud access information, which may be translated by the storage device 104 into tape unit locations (e.g., tape volume identifier, file name, position, etc.) using the table. Following the step 1008 is a step 1012 where the command is sent to the storage device 104 by the driver through the channel subsystem 608 to the storage device 104. Following the step 1012, processing is complete.

In some embodiments, data is compressed and/or encrypted prior to being transferred from the storage device 104 to the tape unit 106. In some embodiments, the system may virtualize an out-of-band connection between the host 102 and cloud storage that provides control data from the host 102 to the cloud storage. Commands that an application on the host 102 attempts to communicate out-of-band with cloud storage may be intercepted by a driver in the drivers layer 606 and simulated by being transferred through the storage device 104, as described elsewhere herein. In instances where the tape unit 106 is a virtual tape unit, such as the DLm960 device, it may be possible to take advantage of data handling features such as data deduplication and snap copy.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein.

In some instances, the order of steps in the flow diagrams, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is stored in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of causing data in an in-band storage device coupled to a host computing system to be transferred to an out-of-band (OOB) storage device, comprising:
   coupling the in-band storage device to the OOB storage device;
   a drivers layer of the host computing system detecting commands from the host computing system to transfer the data in the in-band storage device to a cloud storage that is separate from the OOB storage device, wherein the in-band storage device is separate from the host computing system;
   the drivers layer of the host computing system creating a command to transfer the data from the in-band storage device to the OOB storage device in response to detecting a command to transfer the data from the in-band storage device to the cloud storage; and
   the in-band storage device transferring the data in the in-band storage device to the OOB storage device without transferring the data through the host computing system in response to receiving the command created by the drivers layer of the host computing system.

2. A method, according to claim 1, wherein the OOB storage device is coupled to the cloud storage.

3. A method, according to claim 2, further comprising:
   causing data stored at the OOB storage device to be transferred to the cloud storage.

4. A method, according to claim 1, further comprising:
   the in-band storage device emulating a host computing system in connection with communicating with the OOB storage device.

5. A method, according to claim 1, wherein the OOB storage device is a tape emulation unit.

6. A method, according to claim 5, wherein the data is stored in the OOB storage device using an AWS virtual tape format.

7. A method, according to claim 1, wherein the host computing system expects a return value from the cloud storage following sending the command to transfer the data in the in-band storage device to a cloud storage.

8. A method, according to claim 7, wherein the in-band storage device holds the return value received from the OOB storage device.

9. A method, according to claim 8, wherein the host computing system requests the return value from the in-band storage device.

10. A non-transitory computer readable medium containing software that causes data in an in-band storage device coupled to a host computing system to be transferred to an out-of-band (OOB) storage device coupled to the in-band storage device, the software comprising:
    executable code at a drivers layer of the host computing system that detects commands received at the in-band storage device from the host computing system to transfer the data in the in-band storage device to a cloud storage that is separate from the OOB storage device, wherein the in-band storage device is separate from the host computing system;
    executable code at the drivers layer of the host computing system that creates a command to transfer the data from the in-band storage device to the OOB storage device in response to detecting a command to transfer the data from the in-band storage device to the cloud storage; and executable code that transfers the data in the in-band storage device to the to the OOB storage device without transferring the data through the host computing system in response to receiving the command created by the drivers layer of the host computing system.

11. A non-transitory computer readable medium, according to claim 10, wherein the OOB storage device is coupled to the cloud storage.

12. A non-transitory computer readable medium, according to claim 11, further comprising:
    executable code that causes data stored at the OOB storage device to be transferred to the cloud storage.

13. A non-transitory computer readable medium, according to claim 10, further comprising:
    executable code that emulates a host computing system in connection with communicating with the OOB storage device.

14. A non-transitory computer readable medium, according to claim 10, wherein the OOB storage device is a tape emulation unit.

15. A non-transitory computer readable medium, according to claim 14, wherein the data is stored in the OOB storage device using an AWS virtual tape format.

16. A non-transitory computer readable medium, according to claim 10, wherein the host computing system expects a return value from the cloud storage following sending the command to transfer the data in the in-band storage device to a cloud storage.

17. A non-transitory computer readable medium, according to claim 16, wherein the in-band storage device holds the return value received from the OOB storage device.

18. A non-transitory computer readable medium, according to claim 17, wherein the host computing system requests the return value from the in-band storage device.

* * * * *